United States Patent [19]

Arquilla

[11] 4,385,651
[45] May 31, 1983

[54] TIRE REPAIR PATCH

[76] Inventor: Jack V. Arquilla, 907 W. 4th St., Roanoke Rapids, N.C. 27870

[21] Appl. No.: 293,451

[22] Filed: Aug. 17, 1981

[51] Int. Cl.³ .............................................. B60C 21/02
[52] U.S. Cl. ..................................... 152/367; 156/97
[58] Field of Search ................ 156/97; 152/367, 370, 152/368, 369

[56] References Cited

U.S. PATENT DOCUMENTS 2,057,798  10/1936  Springer ............................... 152/367

Primary Examiner—Edward C. Kimlin
Assistant Examiner—F. K. Wine
Attorney, Agent, or Firm—Oldham, Oldham, Hudak, Weber & Sand Co.

[57] ABSTRACT

A tire patch that has a center rubberized fabric body assembly including overlaid pairs of plies of fabrics, each ply of each pair being a roughly half-moon shaped fabric piece positioned in superimposed but reversed relation to its companion, which pairs of plies are in gradually increasing size from top to bottom of the patch assembly, and top and bottom cover sheets for the patch assembly which has pairs of opposed concave shaped side and end edges to facilitate assembly into a tire carcass adjacent to the tire bead thereof.

9 Claims, 5 Drawing Figures

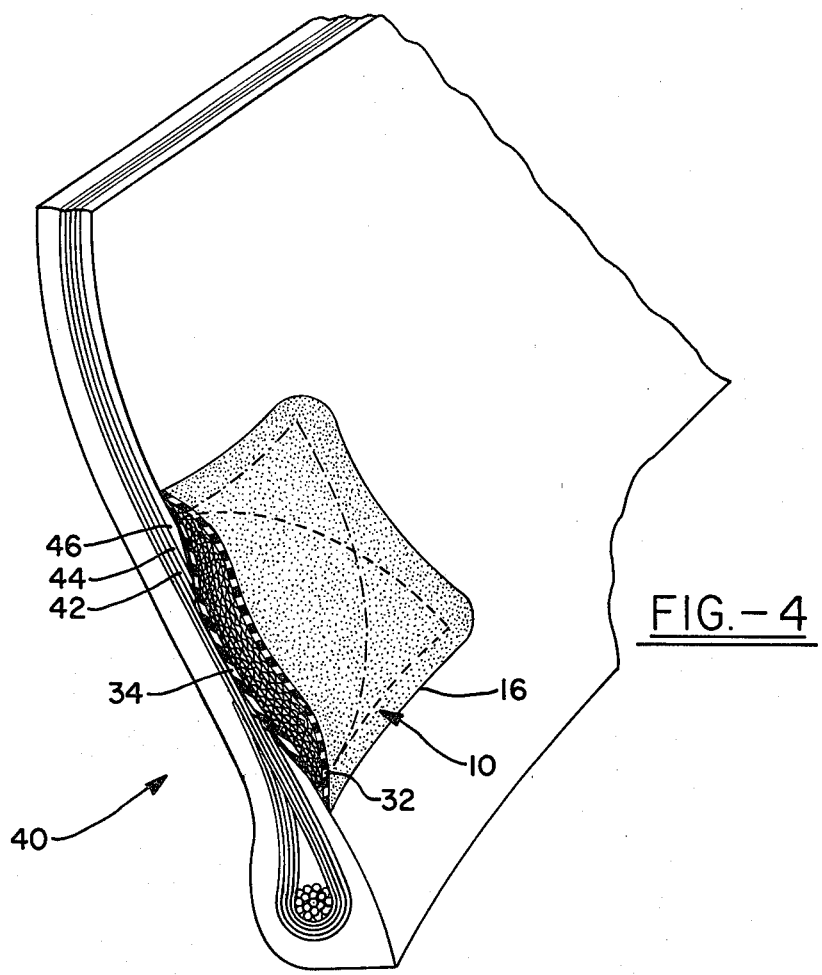
FIG.-4
FIG.-5
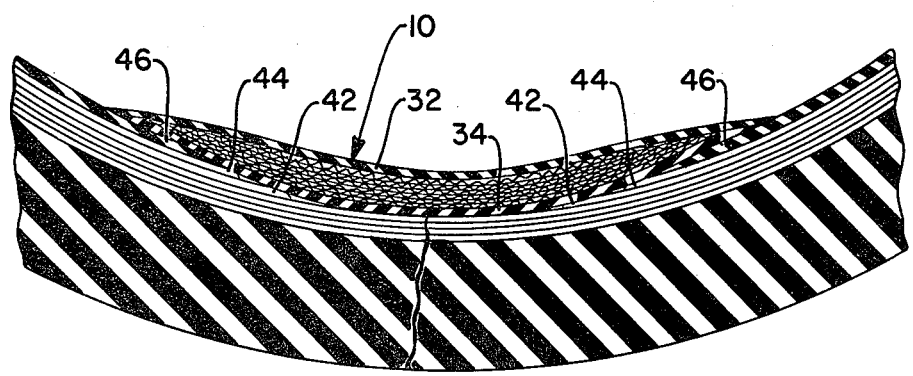

TIRE REPAIR PATCH

BACKGROUND ART

Heretofore there have been many different types of patches proposed for repairing tire carcasses of various types when any damage occurs to such carcass. It is especially important with large so-called earthmover tires or off the road tires which are of very large diameters, normally, and which are made from a number of reinforcing plies in the tire carcass. When these large tires are damaged, obviously it is economically desirable to repair the tires so as to provide an efficient, safe operating tire with minimum delay and cost. It is especially important that a good bond be obtained between the tire patch and the tire carcass, and it also is important that the patched portion of the tire be well reinforced and be of a sturdy, air-tight construction whereby the tire will be able to carry equivalent loads to that for which the original undamaged tire would be suited.

Another problem in tire repair and in providing patches therefore is that these tires come in a wide variety of sizes so that usually a large number of different sizes of patches are required if the tire repair organization is to repair tires of widely varying sizes and pressures.

Typical tire patch constructions have been shown in U.S. Pat. Nos. 1,968,606; 3,267,981; 2,852,058 and 3,036,621. All of these patents show conventional cross-type patches with plies of varying lengths, widths or shapes in the tire patch.

One problem wih all prior types of tire repair patches is that many of them cannot be positioned immediately adjacent the tire bead, or the tire patch only be used when positioned to extend either radially or circumferentially of the tire, so that the patch is limited as to the sizes of tires that it can be used in for repair purposes.

DISCLOSURE OF INVENTION

Thus it is a general object of the present invention to provide an improved tire repair patch particularly adapted to be used in tires of widely varying sizes and wherein the patch is elongate and can extend either transversely or circumferentially of the tire.

Another object of the invention is to provide a symmetrical tire repair patch that can be used with an edge directly up against a tire bead or it can be positioned spaced from the tire bead as desired, and the patch can be used in either the crown or sidewall of a tire.

Another object of the invention is to provide a relatively large oval shaped platform area of maximum reinforcement in the patch from a minimum sized patch having specially contoured reinforcing plies therein; to provide reinforcing plies in tire repair patches that are of generally half-moon shape and wherein two of such plies are normally positioned in superimposed but reversed stacked relation; to provide top and bottom cover layers in a tire repair patch having pairs of opposed concave shaped side edges; to provide a tire repair patch assembly having a plurality of pairs of stacked fabric reinforcing sheets therein of graduated sizes and with the tire repair stack having pairs of opposed side edges of concave arcuate contour, which tire patch assembly side edges are substantially concentric with a pair of concave opposed side edges of top and bottom layers provided on the patch.

Yet another object of the invention is to provide a tire repair patch made from conventional materials and which has specially contoured and sized tire reinforcing plies therein and which has specially contoured opposed side and end edges either of which can be aligned with the bead of a tire, which patch may have a floater gum layer on its base surface to adapt the patch to be positioned readily in a tire carcass prepared for receipt thereof.

The foregoing and other objects and advantages of the invention will be made more apparent as the specification proceeds.

BRIEF DESCRIPTION OF DRAWINGS

Reference now is made to the accompanying drawings wherein:

FI. 4 is a perspective view of the tire repair patch as positioned on the tire sidewall; and FIG. 5 is a section to the tire of FIG. 4 showing the tire repair patch positioned therein.

When referring to corresponding numbers shown in the drawings and referred to in the specification, corresponding numerals are used to facilitate comparison therebetween.

BEST MODE FOR CARRYING OUT THE INVENTION

Figure 1:
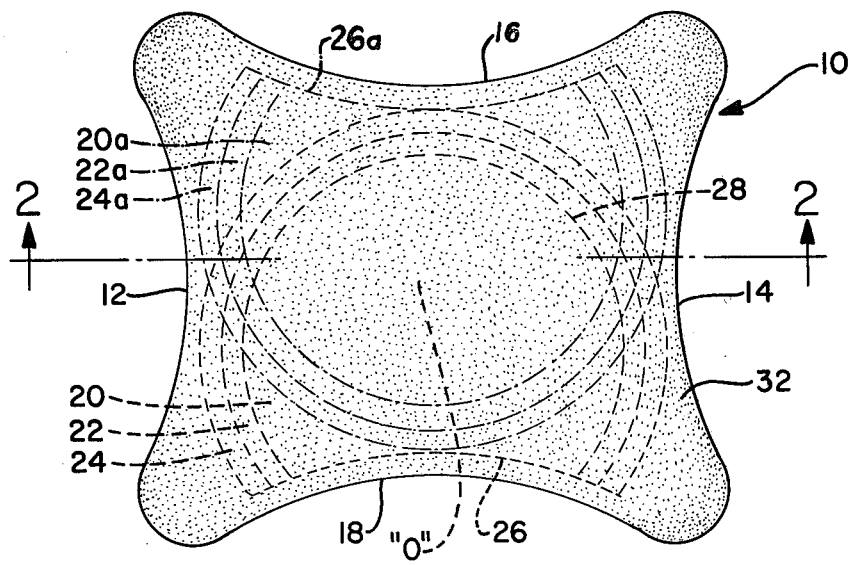
FIG. 1 is a top plan of the tire repair patch embodying the principles of the invention with the pairs of reinforcing plies indicated therein.
Figure 3:
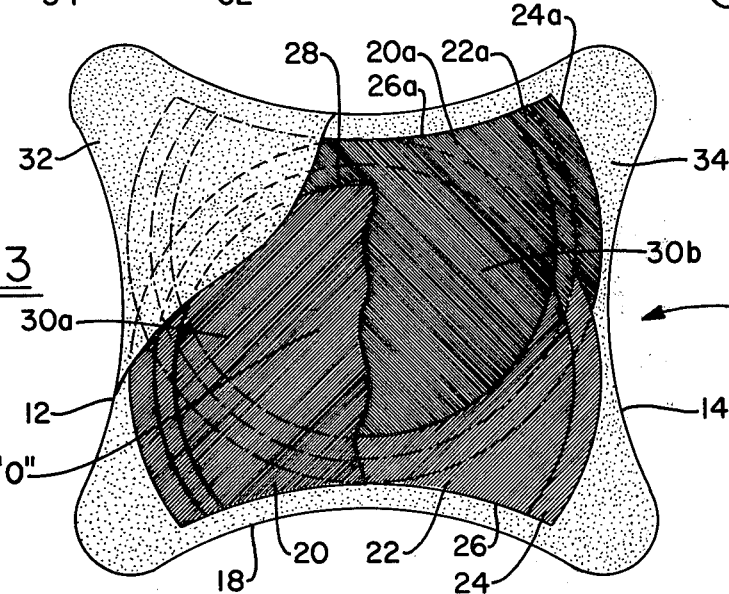
FIG. 3 is a top plan of the patch of FIG. 1 with some of the top cover ply and other ply layers being pulled away to expose the patch construction.

Reference now is particularly made to the details of the construction shown in the drawing, and a tire repair patch of the invention is indicated as a whole by the numeral 10. This tire repair patch as shown in FIGS. 1 and 3 has pairs of end concave edges 12 and 14 and pairs of opposed side edges 16 and 18, the entire patch being of elongated shape. These side and end edges 12 through 18 are formed to arcuate shapes such as to be generally adapted to conform to and follow the bead arc of a tire in which the tire patch 10 is positioned for repair action. Usually these tire patches can be used in tires of varied sizes but with these end and side edges being of such shape as to be at least closedly adjacent to the beads in case any tire carcass break occurs near the beads. Hence, the patch can be positioned over the tire carcass break and effectively reinforce the same.

The tire repair patch 10 of the invention has a center fabric body portion or assembly that comprises, in this instance, three overlaid pairs of plies of rubberized fabric and indicated by the numerals 20, 20a, 22, 22a, 24 and 24a, for these pairs of rubberized fabric plies. It will be seen that each of the pairs of plies comprises a roughly half-moon shaped piece of rubberized fabric which includes, for example, a base edge 26 for the ply 20 which base edge is of a flattened, concave or arcuate contour and with the remaining edge portions of this ply 20 comprising a uniform arc top edge 28 connecting the spaced ends of the base edge together. The opposed plies 20 and 20a in this pair of plies are of substantially the same size and shape and usually of the same height from the center of the top edge 28 to the center of the base 26 whereby the plies can be positioned in reversed by super-imposed relation. The rubberized cords in these plies as indicated at 30a for the ply 20 and/or 30b for the ply 20a are positioned in reversed or opposed angles as is customary in bias ply tire fabric constructions, as indicated in FIG. 1 of the drawings. The remaining pairs of plies of fabric in the tire patch as at the pairs 22 and 24 are progressively of reduced size, an each pair of plies has a pair of opposed flat arc concave edges, as at 26 and 26a which edges are generally concentric with the pairs of opposed edges 16 and 18 in the tire patch.

Plies 20, 22 and 24 are usually slightly wider than the height (depth) thereof and a large percent of the ply overlaps its companion ply to form with the other plies a large center area of maximum strength. Still the patch 10 has four feathered edges at its corners.

Figure 2:
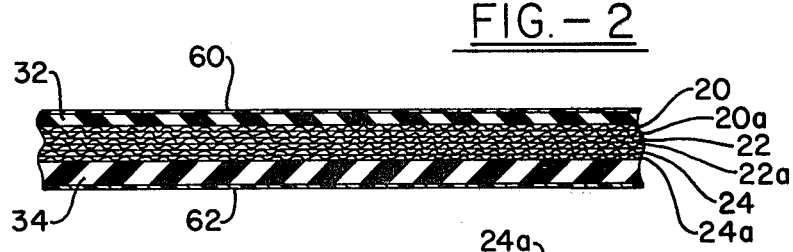
FIG. 2 is an enlarged fragmentary cross-section of the tire patch taken on line 2-2 thereof.

FIG. 2 of the drawings shows that there is a top cover sheet 32 and a bottom cover sheet 34 on this patch 10. These cover sheets are of conventional construction and I prefer to provide a relatively thick floater gum layer as the base ply cover sheet 34 which sheet is thicker than the top ply and may, for example, be about ⅛" thick. It is especially useful in rebuilding the tire carcass as it is being repaired. For example, before applying the tire patch 10 to a tire carcass, in some instances it may be desirable to tear or cut out portions of the inner liner of the tire carcass and this would comprise the layer therein similar to the floater gum layer 34 of the tire patch. Also the inner set of plies may even be pulled or cut out of the tire carcass where it is to be repaired. Normally the tire patch 10 will extend over and beyond any cutout portions of the tire carcass to tie the patch to the entire carcass body.

It should be realized that any type of reinforcing cords or fibers, and compositions can be used in making the various plies of the tire patch. However, it particularly is the configuration of the pairs of plies and their relationship with each other that will provide a maximum reinforcing action at the center of the patch where the tire normally has its extensive damage and the carcass especially needs reinforcing in that area.

The tire cords extend at angles of 45° to the axis of the patch 10 and the plies form an all position patch, being symmetrical it can be used in the crown, as well as in the sidewall of the tire. The angles of cords in the plies are such that the patch can be installed at right angles to the bead of the tire by aligning either the end or the side of the patch to the bead. The oval shaped platform (the primary reinforced area of the patch), because it is two directional, can be placed so that the long part of the oval is aligned with the longest part of the injury whether the injury is radial or circumferential. Both the ends and the sides of the patch are contoured to align with the beads of most off-the-road tires.

In FIG. 4 of the drawings, there is shown a typical tire carcass 40 wherein a tire patch 10 of the invention has been positioned with a side edge 16 of the patch adjacent the bead area of the tire. Previously to applying the tire repair patch to this tire, a portion of the innermost set of plies 42 and 44 have been cut or pulled from the tire carcass 40 and also the inner gum liner 46 in the tire carcass has been partially removed particularly in this area of break in the carcass 40. Thus when the tire patch 10 of the invention is positioned in place, it will have portions of its fabric layers extending out beyond any portions of the tire carcass that had been removed and with the bottom or base cover sheet of the patch blending smoothly into the tire carcass to replace the gum layer 46 therein and aid in bonding the tire patch to the tire carcass. Obviously the tire repair patches are secured to the tire carcasses by conventional means and curing processes. The patches are made from any conventional materials.

The patches of the invention are of somewhat universal properties in that they can be used in repairing tires of a variety of different sizes so that a fewer number of patches would be required on hand in order to service and repair a widely varying number of tires and tire sizes. Furthermore, the tire patch of the invention has major reinforcing and strengthening action in the center portion thereof so that a reduced amount of rubberized fabric and other materials is required in the patch to provide for effective tire repair. Yet the tire can be repaired to substantially its original strength and operative conditions.

As previously indicated, the cords in the plies 20, 20a et al. preferably are at bias angles of about 45° but these cord angles may vary appreciably as desired.

Off the road tire carcasses may have quite a few pairs of plies therein put repairs can be made thereto by patches of the invention having but three or four pairs of plies therein. The generally oval shaped center platform of the patch, indicated at our FIG. 3, has excellent tire repair strength. Such center platform is the primary overlapped ply area of the patch. The feathered corner and edge portions of the patch have feathered overlapped ply areas of decreasing numbers of plies from the center of the patch out to its margins. But such center area bonds well with a tire carcass and has good flexibility in the carcass. This gives the patch a good service life.

The patch 10 usually is positioned in a tire carcass with the layer 34 being radially outermost of the patch. Protective cover sheets 60 and 62 are removed prior to bonding the patch to a tire carcass.

In view of the foregoing, it is thought that the objects of the invention have been achieved.

While one complete embodiment of the invention has been disclosed herein, it will be appreciated that modification of this particular embodiment of the invention may be resorted to without departing from the scope of the invention.

What is claimed is:

1. A tire patch comprising a plurality of superimposed reinforcing plies of various sizes forming a center patch assembly from pairs plies having a pair of opposed edges of concave contour, and said plies are made of a rubberized fabric, and each pair of said plies comprises two roughly half-moon shaped fabric pieces positioned in superimposed but reverse relation, and said pairs of said plies being in a gradually increasing size from top to bottom of said patch assembly, and each said ply having two base corners extending out from overlapped center portions of the pair of plies, and a top and bottom cover layer each having two pairs of opposed concave contour edges, said cover layers being larger than said center patch assembly, one pair of contoured edges of said cover layers being substantially concentric with said concave edges of said center patch assembly.

2. A tire patch as in claim 1, where said plies of rubberized fabric have reinforcing cords therein extending at opposite angles in the two plies of any one pair, and said cover sheet is a gum layer for bonding to a tire carcass.

3. A tire patch as in claim 1, where the individual plies in each pair of plies each have one flat arc concave shaped base edge and a top edge that is formed from one arc and with the plies being of about the same size and height from the base edge to the center of the top edge, which plies are in reversed, superimposed positions.

4. A tire patch as in claim 1, where the patch is elongated and has pairs of flat arcuate shaped opposed edges adapted to match a tire bead contour in a tire carcass.

5. A tire patch as in claim 1, where said center patch assembly is roughly of elliptical shape in a primary overlapped center ply area thereof.

6. A tire patch as in claim 5, where said center patch assembly has feathered base and corner edge portions and has excellent flexibility when bonded to a tire carcass.

7. A tire patch as in claim 1 where said base corners each extend to about the center of the base of the ply.

8. A tire repair patch as in claim 7, which has base edges in its plies of flat arcuate shape and sharper arc top edges.

9. A tire repair patch as in claim 3, which is symmetrical about both its longitudinal and vertical axes.

* * * * *